May 12, 1942.　　　J. W. MacCLATCHIE　　　2,282,488
LUBRICATING MEANS
Filed Aug. 8, 1938　　　2 Sheets-Sheet 1

INVENTOR.
JOHN W. MacCLATCHIE
BY Robert M. McManigal
ATTORNEY.

May 12, 1942.  J. W. MacCLATCHIE  2,282,488
LUBRICATING MEANS
Filed Aug. 8, 1938  2 Sheets-Sheet 2

INVENTOR.
JOHN W. MacCLATCHIE
BY Robert M. McManigal
ATTORNEY.

Patented May 12, 1942

2,282,488

UNITED STATES PATENT OFFICE 2,282,488

LUBRICATING MEANS

John W. MacClatchie, Los Angeles, Calif., assignor, by mesne assignments, to Merco-Nordstrom Valve Company, Pittsburgh, Pa., a corporation of Delaware Application August 8, 1938, Serial No. 223,676

4 Claims. (Cl. 184—105)

This invention relates to a lubricating means for valves, pumps, bearings, and other articles having surfaces requiring lubrication under pressure operating conditions.

In conventional plug valves, pumps, bearings, etc., such as described in Nordstrom Re. 14,516, no means whatever is provided for replenishing the lubricant under normal high pressure operating conditions.

In certain articles, for example, plug valves, a ball check valve is provided at the lower end of the lubricant chamber which is designed to allow the replenishment of the lubricant during such conditions. The difficulty is that during normal high pressure operating conditions the ball check valve becomes contaminated with sand, grit, etc., and therefore fails to effect a seal, thereby permitting the lubricant and other material to escape through the ball check valve.

An object of this invention is to provide a lubricating means for valves, pumps, bearings, and other articles having surfaces requiring lubrication under high pressure operating conditions by means of which the lubricant in the valve or other article, may be absolutely, positively, and definitely sealed off from the lubricant chamber during normal high pressure operating conditions so that the lubricant in the lubricant chamber may be replenished while the valve or other article is in normal operating service.

A further object of the invention is to provide a simple but efficient means for positively and absolutely preventing the escape of lubricant from a valve, pump, bearing, or other article during normal high pressure operating conditions.

A further object of the invention is to provide a lubricating means for valves, pumps, bearings and other articles having surfaces requiring lubrication under high pressure operating conditions without interfering in any manner whatsoever with the operation of the device.

My invention has many other objects, advantages, and features, some of which, with the foregoing, will be set forth at length in the following description where I shall outline certain forms of the invention, which I have selected for illustration in the drawings accompanying and forming a part of the present specification. In the said drawings, I have shown certain forms of my invention as applied to plug valves, but it is to be understood that I do not limit myself to such forms, since the invention, as expressed in the claims, may be embodied in a large plurality of forms.

Referring to the drawings.

Figure 1:
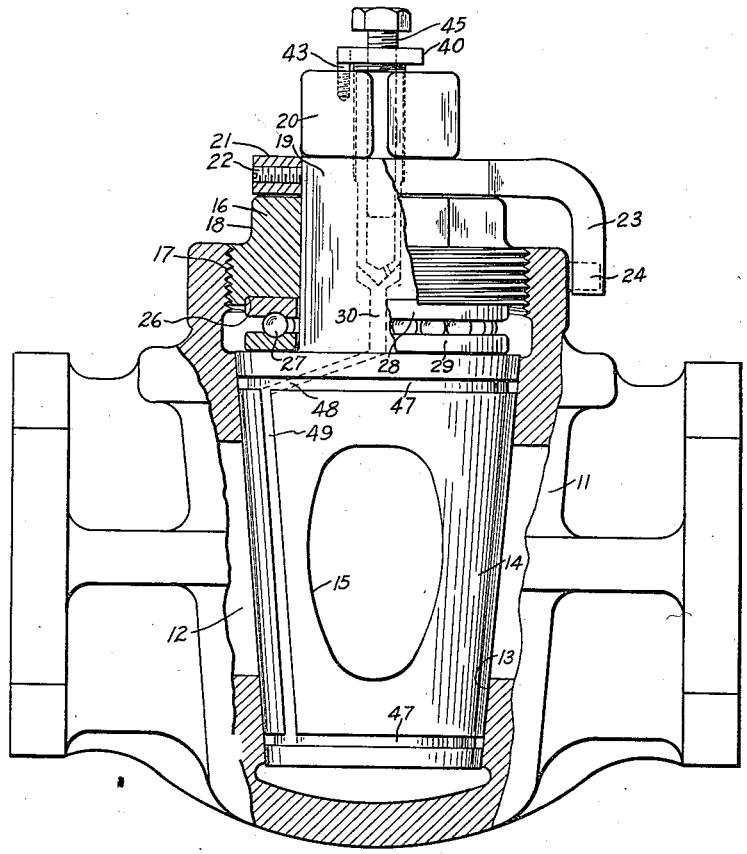
Fig. 1 is a side elevation of a plug valve embodying the features of the invention, partly broken away in axial section.
Figure 2:
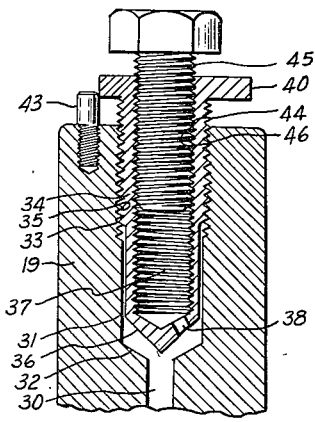
Fig. 2 is an enlarged fragmentary section of the lubricating means, showing the lubricating means in open position.
Figure 3:
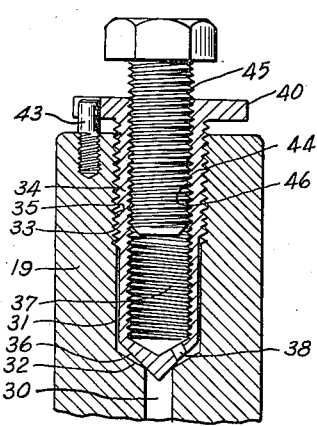
Fig. 3 is a section similar to Fig. 2, showing the lubricating means in closed position.
Figure 4:
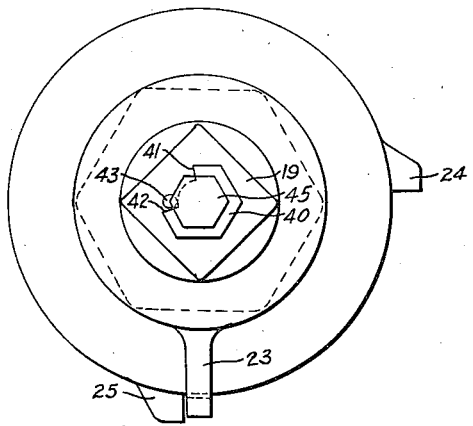
Fig. 4 is a top view with both the lubricating means and the plug valve in open position.
Figure 5:
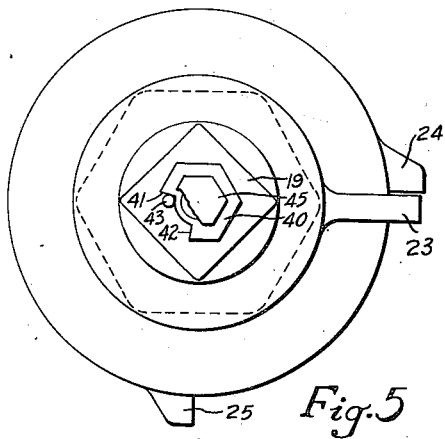
Fig. 5 is a top view with both the lubricating means and the plug valve in closed position.

The invention is applicable to any article having surfaces requiring lubrication under high pressure operating conditions, for example, a plug valve.

The plug valve shown in Figs. 1-5 inclusive, comprises a valve casing 11 having a fluid passageway 12 and transverse opening 13 with a valve plug 14 rotatable in opening 13 and having a transverse hole 15 adapted for alinement or non-alinement with passageway 12 when the plug is rotated. The peripheral surfaces of plug 14 and opening 13 cooperate to define a seating surface for the plug.

A means cooperates with casing 11 for retaining the plug in operative assembly, and in the present instance this means is shown as a cap 16 adapted to be screwed into a threaded end 17 of the transverse opening 13 and having a head 18 adapted for engagement by a suitable tool. The opposite end of the transverse opening 13 is closed by the body of the valve casing. The plug 14 is provided with means for rotating the plug, which may comprise a stem 19 integral with the plug and projecting through the closure cap 16 and having a head 20 adapted for engagement by a suitable tool.

The valve plug is limited to a quarter turn. As an instance of this arrangement a collar 21 is mounted on the plug stem 19 by means of a set screw 22 and is provided with an arm 23 which is adapted for limited movement between the stops 24 and 25 which are secured to the valve casing 11.

The cap 16 is counterbored at its inner end as shown at 26, and a ball race surrounds plug stem 19 and is positioned between counterbore 26 and the end of valve plug 14, the ball race being shown as comprising balls 27, journaled between bearing races 28 and 29. An anti-frictional bearing is thus provided between cap 16 and plug 14 when the cap has been screwed into the threaded end 17 of the opening 13 for seating the valve plug relative to the bearing surface of opening 13, and the valve plug may then be freely turned relative to the stationary caps 16 for opening or closing the valve.

The plug 19 is provided with an axial bore 30 in its lower end, and an enlarged axial bore 31 in its upper end. The lower end of the bore 31 forms a tapered seat 32. The upper end of the bore 31 is provided with left-handed threads 33 into which a cylinder 34 provided with like left-handed threads 35 is adapted to be screwed. The cylinder 34 is provided with a tapered seating surface 36, the angle of said seating surface of said cylinder to the vertical axis of the plug being no greater, and preferably appreciably smaller, than the angle formed by the tapered seat 32 of the bore 31 to said axis. This is in order to provide a definite, absolute, and positive shut-off or seal when the cylinder 34 is in closed position.

The cylinder 34 thus provides a lubricant chamber 37. An opening 38 is provided through the tapered seating surface 36 of the cylinder 34 which opening is located as far from the center of the cylinder as convenient.

The cylinder 34 is provided with a hexagonal nut 40 part of which is cut away as at 41 and 42. A stop pin 43 is threaded into the upper end of the plug stem within the periphery of the hexagonal nut 40 to limit the movement of the cylinder 34 between closed and a limited open position.

The cylinder 34 is also provided with right-handed internal threads 44 to accommodate a pressure screw 45 which is provided with similar threads 46.

Annular grooves 47 are provided at the seating surface of the valve, and these annular grooves are preferably spaced longitudinally of the valve at opposite sides of the transverse hole 15, and in the present example are formed in the bearing surface of the plug rather than in the cooperating bearing surface of the bore 13. The grooves 47 are connected to the lubricant chamber 37 in the plug stem 19 by means of axial bore 30, a bore 48, and a longitudinal groove 49.

In assembling the parts, the valve plug being withdrawn from casing 11, the bearing 27—28—29 is mounted on plug 14 and cap 16 is mounted on bearing ring 26. The cap is then screwed into the threaded end 17 of opening 13 and the threaded engagement of the cap axially shifts the valve plug until it is properly seated in its cooperating opening 13.

When the cylinder 34 is turned to the left as far as possible by means of the hexagonal nut 40, the tapered seating surface 36 of the cylinder is forced into sealing engagement with the tapered seat 32 of the enlarged bore 31, thereby effecting a positive, definite, and absolute shut-off between the axial bore 30 and the lubricant chamber 37.

When the cylinder 34 is in closed position, the pressure screw 45 may be removed and new lubricant in the form of conventional sticks or otherwise inserted in the lubricant chamber 37 and the pressure screw 45 replaced. At all times during re-charging the lubricant in the plug valve below the lubricant chamber 37 is positively and absolutely prevented from escaping.

In order to replenish the lubricant in the grooves 47 between the plug and the casing, the cylinder 34 is turned to the right by means of the hexagonal nut 40 until the stop pin 43 is engaged, thereby raising the cylinder 34 from the seat 32. By turning the pressure screw 45 to the right the lubricant is forced from the lubricant chamber 37 through the opening 38, the axial bore 30, the bore 48 and the longitudinal groove 49 into the annular grooves 47.

After sufficient lubricant has been forced into said annular grooves 47, the cylinder 34 is again turned to the left into closed position, and is adapted to remain in said position during normal operating conditions.

The valve is then ready for use, the stem 19 being rotated to open or close the valve by alining or non-alining hole 15 with the passageway 12. The valve may be conveniently lubricated and the lubricant replenished during normal high pressure operating conditions at will, without interfering in any manner whatsoever with the operation of the valve.

Figure 6:
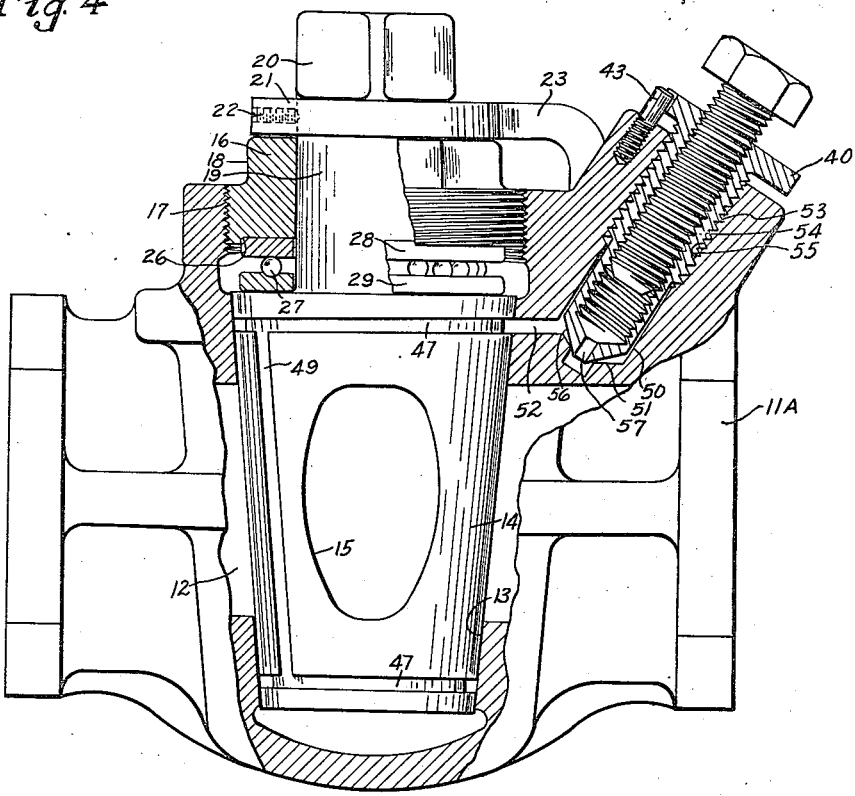
Fig. 6 is a side elevation of a different type of plug valve embodying the features of the invention, partly broken away in axial section.

In Figure 6, I have illustrated the features of my invention as applied in a different manner to a plug valve. In this example, a valve casing 11—A is provided with a bore 50, the lower end of which forms a tapered seat 51. A passageway 52 through the casing 11 connects the upper annular groove 47 with the bore 50, near the periphery of said bore. The upper end of the bore 50 is provided with left-handed threads 53 into which a lubricant cylinder 54 provided with like left-handed threads 55 is adapted to be threaded.

In order to provide an absolute and positive seal between the lubricant cylinder 54 and the tapered seat 51 of the bore when the cylinder is in closed position, the lubricant cylinder is provided with a tapered seating surface 56, the angle of said seating surface to the axis of the bore 50 being no greater, and preferably somewhat smaller, than the angle formed by the seat 51 to said axis. The center of the lower end of the lubricant cylinder 54 is provided with an opening 57.

The lubricant cylinder 54 is provided with a hexagonal nut 40 part of which is cut away. A stop pin 43 is threaded into the casing 11 within the periphery of said nut 40 in order to limit the movement of the cylinder 54 between closed and a limited open position. The cylinder 54 is also provided with right-handed internal threads 44 to accommodate a pressure screw 45 which is provided with similar threads 46.

The construction of the remainder of the valve, the assembly, and the operation of said valve are deemed to be apparent from the description set forth herein in connection with the form of the invention shown in Figs. 1–5 inclusive and will therefore not be set forth herein, except as follows:

When the cylinder 54 is turned to the left as far as possible by means of the hexagonal nut 40, the tapered seating surface 56 of the cylinder 54 is forced into sealing engagement with the tapered seat 51 of the bore 50, thereby effecting an absolute, definite and positive seal between the lubricant cylinder 54 and the seating surfaces between the plug and the casing.

When the cylinder 54 is turned to the right by means of the hexagonal nut 40 until the stop pin 43 is engaged, the seating surface 56 is raised from the seat 51 and lubricant may be forced through said opening, the passageway 52, the longitudinal groove 49, into the annular grooves 47.

From the foregoing description taken in connection with the accompanying drawings, the uses, advantages, and operation of the lubricating means will be readily understood by those skilled in the art to which the invention appertains.

While I have described the principle of operation together with the forms of my invention as applied to plug valves which I now consider to be the best embodiment thereof, I desire to have it understood that the articles shown are merely illustrative and that the invention is not to be limited to the details disclosed herein, but is to be accorded the full scope of the appended claims.

I claim:

1. Apparatus for supplying lubricant to a zone exposed to fluid at high pressure and for positively preventing escape of fluid from said zone comprising a housing enclosing said zone, a bore extending into said housing from the outer surface thereof and having a tapered seat at its inner end, a passageway leading from said bore to said zone, a lubricant container threaded for axial movement within said bore and having its inner end in the form of a tapered seating surface to cooperate with said tapered seat upon inward axial movement of said lubricant container to provide a positive seal between said passageway and said bore and to open communication between said bore and said passageway upon outward axial movement of said lubricant container, an aperture in said lubricant container, and a plunger threaded for advancement in said lubricant container for forcing lubricant from said lubricant container into said bore and through said passageway to said zone while said bore is in open communication with said passageway, said plunger being threaded into said lubricant container in reverse direction relative to the threading of said lubricant container into said bore.

2. Apparatus for supplying lubricant to a zone exposed to fluid at high pressure and for positively preventing escape of fluid from said zone comprising a housing enclosing said zone, a bore extending into said housing from the outer surface thereof and terminating at its inner end in a tapered seat, a passageway leading from said bore to said zone, a lubricant container threaded for axial movement within said bore, an aperture in said lubricant container, the inner end of said lubricant container being in the form of a tapered seating surface to cooperate with said tapered seat upon inward axial movement of said lubricant container to provide a positive seal between said passageway and said aperture and to open communication between said aperture and said passageway upon outward axial movement of said lubricant container, and a plunger threaded for advancement into said lubricant container for forcing lubricant from said lubricant container through said aperture and through said passageway to said zone while said aperture is in open communication with said passageway, said plunger being threaded into said lubricant container in reverse direction relative to the threading of said lubricant container into said bore.

3. Apparatus for supplying lubricant to a zone exposed to fluid at high pressure and for positively preventing escape of fluid from said zone comprising a housing enclosing said zone, a bore extending into said housing from the outer surface thereof and having a tapered seat at its inner end, a passageway leading from said bore to said zone, a lubricant container threaded for axial movement within said bore and having its inner end in the form of a tapered seating surface to cooperate with said tapered seat upon inward axial movement of said lubricant container to provide a positive seal between said passageway and said bore and to open communication between said bore and said passageway upon outward axial movement of said lubricant container, an aperture in said lubricant container, said tapered seat and said tapered seating surface being inclined at different angles with respect to the axis of said bore, and means for forcing lubricant from said lubricant container into said bore and through said passageway to said zone while said bore is in open communication with said passageway.

4. Apparatus for supplying lubricant to a zone exposed to fluid at high pressure and for positively preventing escape of fluid from said zone comprising a housing enclosing said zone, a bore extending into said housing from the outer surface thereof and having a tapered seat at its inner end, a passageway leading from said bore to said zone, a lubricant container threaded for axial movement within said bore and having its inner end in the form of a tapered seating surface to cooperate with said tapered seat upon inward axial movement of said lubricant container to provide a positive seal between said passageway and said bore and to open communication between said bore and said passageway upon outward axial movement of said lubricant container, an aperture in said lubricant container, means for forcing lubricant from said lubricant container into said bore and through said passageway to said zone while said bore is in open communication with said passageway, and cooperating stop means on said lubricant container and on said housing for limiting axial movement of said lubricant container with respect to said bore to a predetermined degree.

JOHN W. MacCLATCHIE.